United States Patent
Etoh et al.

(10) Patent No.: US 6,941,473 B2
(45) Date of Patent: Sep. 6, 2005

(54) MEMORY DEVICE, STACK PROTECTION SYSTEM, COMPUTER SYSTEM, COMPILER, STACK PROTECTION METHOD, STORAGE MEDIUM AND PROGRAM TRANSMISSION APPARATUS

(75) Inventors: Hiroaki Etoh, Kanagawa-ken (JP); Kunikazu Yoda, Tokyo-to (JP)

(73) Assignee: International Business Machines Corporation, Armonk, NY (US)

(*) Notice: Subject to any disclaimer, the term of this patent is extended or adjusted under 35 U.S.C. 154(b) by 743 days.

(21) Appl. No.: 09/772,373

(22) Filed: Jan. 30, 2001

(65) Prior Publication Data

US 2001/0013094 A1 Aug. 9, 2001

(30) Foreign Application Priority Data

Feb. 4, 2000  (JP) ........................................ 2000-028358

(51) Int. Cl.[7] .............................................. G06F 12/16
(52) U.S. Cl. ....................................... 713/201; 713/200
(58) Field of Search ................................ 713/201, 200; 718/100; 714/25

(56) References Cited

U.S. PATENT DOCUMENTS 5,949,973 A * 9/1999 Yarom ........................ 713/200

OTHER PUBLICATIONS

Cowan et al□□http://www.cse.ogi.edu/DISC/projects/immunix/StackGuard/usenixsc98_html/paper.html□□.*

Smith□□http://www.eecs.umich.edu/~aprakash/security/handouts/Stack_Smashing_Vulnerabilities_in_the_UNIX_Operating_System.pdf.*

* cited by examiner

*Primary Examiner*—Gregory Morse
*Assistant Examiner*—Andrew Nalven
(74) *Attorney, Agent, or Firm*—Rafael Perez-Piniero; Anne Vaehon Dougherty

(57) ABSTRACT

A memory device is provided that is used by a computer system and that has a memory pattern obtained after a function is called when the computer system executes a program, the memory pattern comprising: a return address storage area for storing a return address 230 for the source of a call for the execution of a currently active function; a previous frame pointer storage area for storing a previous frame pointer 220 to the calling source for the execution of a currently active function; and a local variable storage area to be located below the return address storage area 230 and the previous frame pointer storage area 22, wherein when a data array 211 is stored in the local variable area, a guard variable 212 is stored in a location preceding the data array 211, and wherein the guard variable is used as a target to confirm whether the return address has been destroyed.

19 Claims, 8 Drawing Sheets

- variable declaration
  volatile int guard;

- function entrance
  gv=guard_value;

- function exit
  if(gv!=guard_value){
      /*output error log*/
      /*halt execution */
  }

FIG. 5

```
void foo()
{
        volatile int guard;  <------601
        char buf[128];

gv=guard_value;  <------ 602

--- strcpy (buf,getenv ("HOME"));

--- if(gv!=guard_value){
            /*output error log*/  <------603
            /*halt execution */
        }
}
```

FIG. 6

```
void foo()
{
    char buf[128];
    _ _ _
    stropy (buf,getenv ("HOME"));
    _ _ _
}
```

MEMORY DEVICE, STACK PROTECTION SYSTEM, COMPUTER SYSTEM, COMPILER, STACK PROTECTION METHOD, STORAGE MEDIUM AND PROGRAM TRANSMISSION APPARATUS

FIELD OF THE INVENTION

The present invention relates to a stack protection method for protecting a program counter from an instruction of a computer by stack smash attacks.

BACKGROUND OF THE INVENTION

Generally, when unauthorized users break into computer systems, they accomplish this either by attacking systems that have been incompletely set up or by maliciously exploiting weak points, called security holes. Intruders can also access systems by surreptitiously exercising access rights belonging to other persons, and can, by exploiting the opportunities such entries afford them, acquire network administrators privilege levels for use in future attacks.

A typical attack one called stack smashing. Such an attack can be especially damaging, since return addresses are stored in stacks, along with local variables and arguments, to maintain the execution status of sub-routines. A stack smashing attack involves the application of a procedure used to rewrite return addresses in a stack so that control of an operation can be shifted to a maleficent program.

A stack smashing attack will be specifically explained by employing a stack structure. FIG. 9 is a diagram showing a stack after a function is called in the C language. Referring to FIG. 9, a local variable (LV), a frame pointer for a preceding function (a Previous Frame Pointer: PFP), which is a calling source for the pertinent function, and a return address (RA) for returning to the calling source are stacked in order, reading from the stack top. The frame pointer (FP) is a base pointer for relatively referring to the local variable. During a stack smashing attack, a substitution into the local variable (especially, a data array) is performed, and when the boundary check is incomplete, the stack area above the local variable is destroyed. When the stack area is to be destroyed, a program is written into a memory, as is also a value indicating the program has been written in the return address areas. Thus, if a function return process is performed in this state the newly written program will be activated.

A stack smashing attack will be more specifically explained by using a program written in the C language. FIG. 10 is a diagram showing an example C language program that is the target of a stack smashing attack, and FIG. 11 is a diagram for explaining the configuration of a stack when the stack smashing attack is launched against the program. In FIG. 10, "foo" is a function used for copying the contents of an environment variable HOME to a local variable. Since the library function "strcpy" does not take into account the size of the local variable, when 128 or more characters are contained in the environment variable HOME, the contents (the shaded portions) above "buf" in FIG. 11 are destroyed by overwriting them and embedding a malign program in the stack. The head address of the embedded program is positioned in the return address area, so that control of the operation is effectively shifted to the embedded intruder.

As a result of a described stack smashing attack, an unauthorized user, who has gained access to a computer network managed by another party, could siphon off confidential information or could destroy the computer network system. Further, after embedding the program, the unauthorized user would be able to steal any number of IDs and passwords assigned to authorized users, and would then be able to use these authenticators to make further invasions while disguised, or could use them to support attempts to invade other computer systems.

Conventionally, this type of stack smashing attack has mainly been directed against UNIX servers. Recently, however, buffer overflows involving ActiveX (Acrobat Control for ActiveX; ActiveX is a trademark of Microsoft Corp.) have become problems, and units on which ActiveX is used have become the targets of stack smashing attacks. As a result, the general run of computers connected to networks, i.e., all server machines, client machines and PDAs, could be targeted for attack.

In general, the problem has been that bugs have not been removed until after buffer overflows have occurred. Thus, in order to prevent attacks during which the presence of bugs is exploited, it is generally accepted that specific countermeasures should be instituted to prevent such events. As a result, a variety of conventional means have been proposed for preventing computer system intrusions.

As an example of these conventional techniques, the program StackGuard is disclosed, for example, in the reference, "Automatic Detection And Prevention Of Buffer-Overflow Attacks," Crispin Cowan, Calton Pu, David Majer, Heather Hinton, Peat Bakke, Steve Beattie, Aaron Grier, Perry Wagle, and Quan Zhang the 7th USENIX Security Symposium, San Antonio, Tex., January 1998. According to the employment of StackGuard, special value, a "guard_value," for protection of return addresses is inserted between the return address area in the stack in FIG. 9 and the frame pointer area that constitutes the calling source. Then, during a function return process, the validity of the guard_value is examined to confirm the presence/absence of an attacking program.

In addition to this conventional technique, other methods have been proposed: a method for operating a virtual memory page, and for inhibiting the writing of data in the return address storage location in a stack; or a method for protecting a return address by separately preparing a dedicated stack for its storage, for copying the return address to the special stack at the time a function is executed, and for returning the return address from the dedicated stack during a function return process. Further, in order to prevent all attacks precipitated by buffer overflows, a method can be employed to check the boundaries for all array accesses.

However, the conventional techniques for preventing the computer system intrusions, as is described above, have the following shortcomings.

According to the StackGuard program described in the above mentioned reference, the guard_value is stored between an address to be used to return to a preceding function, which is the calling source for the function that is currently being executed, and the frame pointer (hereinafter referred to as a PFP) at the preceding function. Thus, while the return address is protected, the frame pointer that is used to describe the scope of the variable is not, and this constitutes a serious security hole.

In other words, since the frame pointer is not protected, intrusive control of the program counter is possible. An overview of the problem will now be explained.

In the function return processing, the following transactions take place.
FP→SP
PFP→FP (SP)→PF; return operation Here, FP denotes a frame pointer, SP denotes a stack pointer and PC denotes a program counter; an arrow is used to indicate the substitution of a value; and the parentheses are used to identify a direct reference.

As is shown above, since the StackGuard program does not protect the PFP in a stack, the value of the PFP can be controlled by an external attack. And when the transmission of the value is examined and the above function return processing is referred to, only the PFP need be used to control the frame pointer at the first return and to control the program counter at the second return. While actually a test based on the guard_value must be passed in order to embed malicious code, a stack smashing attack can be delivered to the guard_value that is used as a default by the StackGuard. Furthermore, a method for attacking the other guard_value may also be found.

Therefore, the conventional method for which the Stack-Guard program is used can not completely prevent a stack smashing attack.

In addition, according to the StackGuard program, the validity of the guard_value must always be confirmed at the time of the second return in order to detect to what degree the frame pointer is affected that was damaged at the first return. Therefore, for all the functions the program is produced to confirm the validity of the guard_value. As a result, overhead is always incurred because of the process for confirming the validity of the guard_value.

Further, since according to the StackGuard program the guard_value is inserted between the return address area and the PFP area, the frame structure of the stack is changed, and therefore, debugging support can not be provided for a program for which the StackGuard is mounted.

According to the conventional technique for operating a virtual memory page and for inhibiting the writing of data in a return address storage location in a stack, although the return address is protected, the frame pointer is not. Therefore, a security hole is present other than the one for which StackGuard is deployed, and full protection can not be provided to prevent a stack smashing attack.

Further, since control is shifted to a supervisory mode when data is written in a stack, the overhead required for the execution is exceedingly large.

According to the conventional technique whereby a separate, dedicated stack is prepared for the storage of a return address, and whereby a return address is copied to the dedicated stack when a function is called and is returned to the original stack the dedicated stack when the execution process is returned to the calling function, a direct attack on the return address can be delivered. That is, since the return address is returned from the dedicated stack prepared in the global variable area to the original stack without the validity of its value being confirmed, an attack on an operation for returning the return address from the dedicated stack would constitute a direct attack on the return address. For this conventional technique, the required overhead for the management of the dedicated stack is also exceedingly large.

When, however, boundary checking is performed for all the array accesses, as is described above, all attacks due to buffer overflow can be prevented; but for the program, since it mainly involves the use of a pointer, once more the overhead is exceedingly large.

To resolve the above technical shortcomings, it is one object of the present invention to completely prevent a stack smashing attack that is caused by the overflow of a buffer in a stack.

It is another object of the present invention to reduce the execution overhead related to the employment of stack smashing attack prevention means.

SUMMARY OF THE INVENTION

To achieve the above objects, according to the present invention, a memory device is provided that is used by a computer system and that has a memory pattern obtained after a function is called when the computer system executes a program, the memory pattern comprising: a return address storage area for storing a return address for the source of a call for the execution of a currently active function; a previous frame pointer storage area for storing a previous frame pointer to the calling source for the execution of a currently active function; and a local variable storage area to be located below the return address storage area and the previous frame pointer storage area, wherein when a data array is stored in the local variable area, a guard variable is stored in a location preceding the data array, and wherein the guard variable is used as a target to confirm whether the return address has been destroyed. With this arrangement, not only the return address but also the previous frame pointer is protected, and system intrusions and smashing attacks can be completely prevented.

In addition, the target for the stack protection using the guard variable is limited to a case where the data array is stored in the local variable storage area, so that the overhead required for the system can be reduced.

When a character string is stored in the local variable storage area in the memory pattern of the memory device, the guard variable is stored preceding the character string. That is, only when a character string is stored in the local variable storage area is the stack protection process using the guard variable performed. With this arrangement, since the stack protection process using the guard variable is not performed for a function having no character string and a function having a data array other than the character string, the overhead for the system can be further reduced.

Since target data arrays for stack smashing attacks are mainly character strings, safety is not greatly deteriorated even when the objects of stack protection processes using guard variables are limited to only those functions that have character strings. Thus, it is preferable that this arrangement be employed for systems for which processing speeds are important.

A random number can be employed as the guard variable that is stored in the local variable storage area. And an arbitrary value that an attacker can not be aware of can also be used as the guard variable.

According to the present invention, a memory device is provided that is used by a computer system and that has a memory pattern obtained after a function is called while the computer system is executing a program, the memory pattern comprising: a return address storage area for storing a return address for the source of a call for a function that is currently being executed; a previous frame pointer storage area is located below the return address storage area for the storage of a previous frame pointer for the source of the call; and a local variable storage area is located below the previous frame pointer storage area, wherein when a data array is stored in the local variable storage area, a guard variable is stored between the previous frame pointer and the data array, and wherein the guard variable is used as a target to confirm whether the return address has been destroyed during a process for returning from the function that is currently being executed. That is, the guard variable can be stored at any location in the stack between the previous frame pointer and the data array.

According to the present invention, a stack protection system, which protects a program counter from a stack smashing attack while a computer is executing a program, comprises: a stack protection instruction preparation unit for receiving a source program, and for adding, to the source program, an instruction for storing a guard variable between a previous frame pointer in a stack that is obtained after a function has been called, and a data array stored in the stack as a local variable; and a stack protection execution unit for executing the program to which the instruction for storing the guard variable is added by the stack protection instruction preparation unit, and for, in accordance with the instruction, storing the guard variable in the stack during a function calling process and for confirming the validity of the guard variable during a function return process. This arrangement is superior, because when the program is being executed both the return address and the previous frame pointer can be protected, and because an intrusion during which a stack smashing attack is made can be completely prevented.

When destruction of the guard variable is discovered during the function return process, the stack protection execution unit performs an abnormal end process to halt the execution of the program, and to notify a user of an occurrence of a stack smashing attack. This arrangement is preferable, because when the stack smashing attack is delivered, the execution of the program is halted immediately before the process returns to the source that called the function, so that the system intrusion can be effectively prevented.

The stack protection instruction preparation unit is mounted in a compiler that processes the source program written in a compatible language. Then, when the source program is translated into an object program, the compiler adds to the object program the instruction for the storage of the guard variable. This arrangement is preferable because it is easy to locate the declaration of a guard variable at a higher address in a stack than a variable that causes an overflow, and to insert a program at the entrances to all the functions.

According to the present invention, a stack protection system, which protects a program counter from a stack smashing attack when a computer executes a program, comprises: program execution means, for receiving and executing a program to which an instruction is added for the storage, before a function is executed, of a guard variable between a previous frame pointer in a stack and a data array stored as a local variable in the stack, and for, in accordance with the instruction, storing the guard variable in the stack during a function calling process, and for confirming the validity of the guard variable during a function return process; and abnormal end execution means for, when the program execution means detects during the function return process that the guard variable has been destroyed, performing an abnormal end process for halting the execution of a program and for notifying a user that a stack smashing attack has occurred. This arrangement is preferable, because the stack can be protected during the execution of a program to which the instruction for storing the guard variable has been added by any means, including manually.

According to the present invention, a computer system comprises: a data processor for performing various calculations; and a memory device that is used by the data processor for the calculations and that has a memory pattern that is obtained after a function is called while the computer system is executing a program, the memory pattern including a return address storage area for storing a return address for the source of a call for a function that is currently being executed, a previous frame pointer storage area for storing a previous frame pointer for the source of the call for the function that is currently being executed, and a local variable storage area that is located below the return address storage area and the previous frame pointer storage area, wherein, when a data array is stored in the local variable storage area, a guard variable is stored preceding the data array in the local variable area, and wherein, the guard variable is used as a target to confirm, during a process for the return of the function that is currently being executed, whether the return address has been destroyed. With this arrangement, not only the return address but also the previous frame pointer are protected, and a system intrusion for the purpose of launching a stack smashing attack can be completely prevented.

In addition, the target for the stack protection using the guard variable is limited to a case where the data array is stored in the local variable storage area, so that the overhead required for the system can be reduced.

According to the present invention, a computer system comprises: a data processor for performing various calculations; and a memory device used by the data processor for the calculations, that has a memory pattern that is obtained after a function is called while the computer system is executing a programs the memory pattern including a return address storage area for storing a return address for a source that called a function that is currently being executed, a previous frame pointer storage area that is located below the return address storage area for the storage of a previous frame pointer for the source that called the function, and a local variable storage area that is located below the previous frame pointer storage area, wherein when a data array is stored in the local variable storage area, a guard variable is stored between the previous frame pointer and the data array, and wherein the guard variable is used as a target to confirm whether the return address has been destroyed during a process for returning from the function that is currently being executed. The guard variable can be stored at any location in the stack between the previous frame pointer and the data array.

According to the present invention, a computer system, which controls a program for performing various calculations, comprises: a data processor for reading and executing a program to which an instruction is added for the storage, when a function is to be executed, of a guard variable between a previous frame pointer in a stack and a data array stored as a local variable in the stack; and a memory device used by the data processor to perform calculations, wherein, in accordance with the instruction for storing the guard variable that is added to the program, the data processor stores the guard variable in the stack of the memory device during a function calling process, and confirms the validity of the guard variable during a function return process. With this arrangement, when the program to which the guard variable storage instruction has been added is provided using a recording medium, such as a magnetic disk or an optical disk, or is provided via a network for the computer system, the computer system on which this program is installed can execute the stack protection process.

When destruction of the guard variable is found during the function return process, the data processor performs an abnormal end process to halt the execution of the program, and to notify a user of the occurrence of a stack smashing attack. This arrangement is preferable, because when a stack smashing attack is delivered, the execution of the program is halted immediately before the process returns to the function calling source, so that a system intrusion can be effectively prevented.

According to the present invention, a computer system, which controls a program for performing various calculations, comprises: a data processor for receiving a source program and for adding, to the source program, an instruction for storing a guard variable between a previous frame pointer in a stack that is obtained after a function is called, and a data array stored in the stack as a local variable, and for executing the program to which the instruction for storing the guard variable has been added; and a memory device used by the data processor to perform the calculations, wherein in accordance with the instruction for storing the guard variable the data processor stores the guard variable in the stack of the memory device during a function calling process, and confirms the validity of the guard variable during a function return process. This arrangement is superior, because the guard variable storage instruction is added to an arbitrary program, and by executing this program, a system intrusion using a stack smashing attach can be completely prevented. The program may be written in either a compiled language or an interpreted language. For a program that is written in a compiler languages the data processor also functions as a compiler.

When destruction of the guard variable is discovered during the function return process, the data processor performs an abnormal end process to halt the execution of the program, and to notify a user of the occurrence of a stack smashing attack. This arrangement is preferable, because when a stack smashing attack is launched, the execution of the program is halted immediately before the process returns to the source that called the function, so that a system intrusion can be effectively prevented.

According to the present invention, a compiler, which receives a source program, translates the source program to provide an object program and then outputs the object program, comprises: translation means for translating a program; and stack protection instruction addition means for examining each sub-routine to determine whether a function included in the sub-routine has a data array, and for, when a data array is included, adding to the sub-routine an instruction for storing, before a function is executed, a guard variable between a previous frame pointer in a stack and a data array stored as a local variable in the stack, and for confirming the validity of the guard variable during a function return process. This arrangement is superior because a necessary instruction can be added to a source program when it is compiled.

According to the present invention, a stack protection method, whereby a program counter is protected from a stack smashing attack while a computer is executing a program, comprises the steps of: adding, to a source program, an instruction for storing a guard variable between a previous frame pointer in a stack that is obtained after a function has been called, and a data array stored in the stack as a local variable; executing the program to which the instruction for storing the guard variable is added, and, in accordance with the instruction, storing the guard variable in the stack during a function calling process and confirming the validity of the guard variable during a function return process; when destruction of the guard variable is discovered during the function return process, halting the execution of the program and notifying a user of an occurrence of a stack smashing attack.

Similarly, a stack protection method, whereby a program counter is protected from a stack smashing attack when a computer executes a program, comprising the steps of: executing a program to which an instruction is added for the storage, before a function is executed, of a guard variable between a previous frame pointer in a stack and a data array stored as a local variable in the stack, and, in accordance with the instruction, storing the guard variable in the stack during a function calling process and confirming the validity of the guard variable during a function return process; and when it is detected during the function return process that the guard variable has been destroyed, halting the execution of a program and notifying a user that a stack smashing attack has occurred. This arrangement is preferable, because the stack can be protected during the execution of a program to which the instruction for storing the guard variable has been added by any means, including manually.

According to the present invention, provided is a storage medium on which input means for a computer stores a computer-readable program, the program permitting the computer to perform: a process for storing, before a function having a data array is executed, a guard variable between a previous frame pointer in a stack and a data array stored as a local variable in the stack; a process for confirming the validity of the guard variable during a function return process; and a process for, when it is detected during the function return process that the guard variable has been destroyed, halting the execution of a program and notifying a user that a stack smashing attack has occurred. This arrangement is preferable because all the systems that execute this program can protect a program counter from a stack smashing attack.

This type of program is not limited, and may be written in either a compiled language or an interpreted language.

According to the present invention, a program transmission apparatus comprises: storage means for storing a program that permits a computer to perform a process for storing, before a function having a data array is executed, a guard variable between a previous frame pointer in a stack and a data array stored as a local variable in the stack, a process for confirming the validity of the guard variable during a function return process, and a process for, when it is detected during the function return process that the guard variable has been destroyed, halting the execution of a program and notifying a user that a stack smashing attack has occurred; and transmission means for reading the program from the storage means and for transmitting the program. With this arrangement, a program counter can be protected from a stack smashing attack by all the systems that can download the program from the program transmission apparatus and install it.

BRIEF DESCRIPTION OF THE DRAWINGS

The invention will now be described in greater detail with specific reference to the appended figures wherein:

FIG. 5 is a diagram showing example stack protection programs that are to be inserted into a program that in accordance with the embodiment is targeted for stack protection;

FIG. 6 is a diagram showing the state wherein the programs in FIG. 5 are inserted into a program in FIG. 10;

DETAILED DESCRIPTION OF THE INVENTION

The present invention will now be described in detail during the course of an explanation of the preferred embodiment, given while referring to the accompanying drawings.

First, an overview of the present invention will be given. In a memory pattern (allocation of memory areas) for the execution of a program, a guard variable, which is a special value provided to protect a program counter from a stack smashing attack, is inserted between a previous frame pointer (PFP) in a stack and a data array in a local variable area. During a function return process, the validity of the guard variable is examined to confirm the presence or absence of a stack smashing attack.

A stack smashing attack involves the loading of data into a local variable, and when boundary checking is incomplete, the stack area above the local variable is destroyed. Thus, when a stack smashing attach occurs at a stack into which a guard variable has been inserted, between the previous frame pointer and the data array, the destruction of the guard variable is detected at the entrance of the function. Since the execution of the program is halted at this time, both the return address for the source that called the function and the previous frame pointer can be protected and the destruction of the pertinent system can be prevented.

Figure 1:
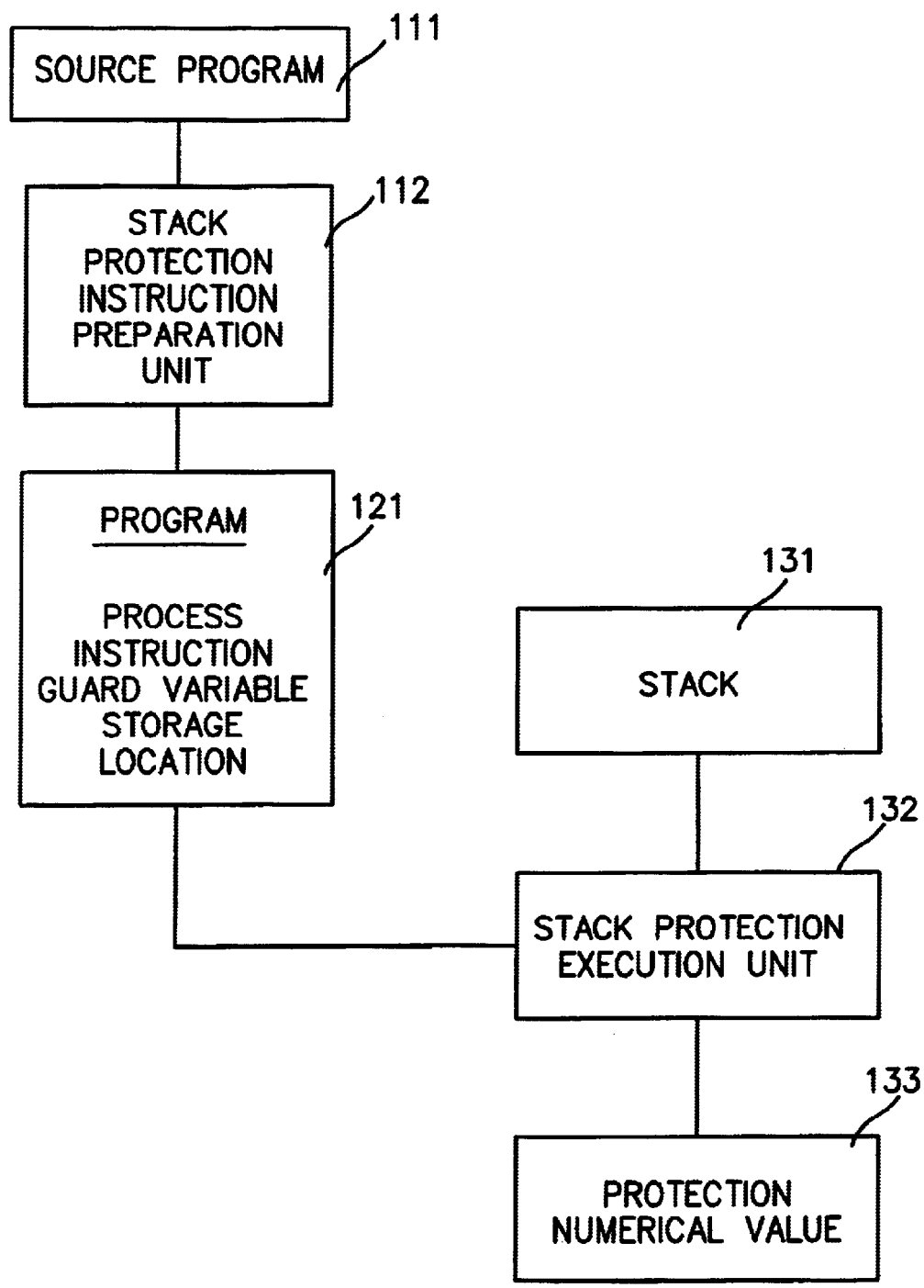
FIG. 1 is a diagram for explaining the general arrangement of a stack protection system according to one embodiment of the present invention.

FIG. 1 is a diagram for explaining the general arrangement of a stack protection system according to the embodiment of the present invention. In FIG. 1, the stack protection program comprises: a source program 111; a stack protection instruction preparation unit 112, for preparing an instruction for storing a guard variable at a predetermined location in the source program 111, and for adding the instruction to a program; a program 121, to which the storage instruction and the location instruction for the guard variable are added; a stack 131, for forming a memory pattern in a computer memory device; a stack protection execution unit 132, for executing the program 121 and for protecting the stack in accordance with the storage instruction and the location position for the guard variable, which are added to the program 121; and a numerical protection value 133, which is used as a guard variable.

Figure 2:
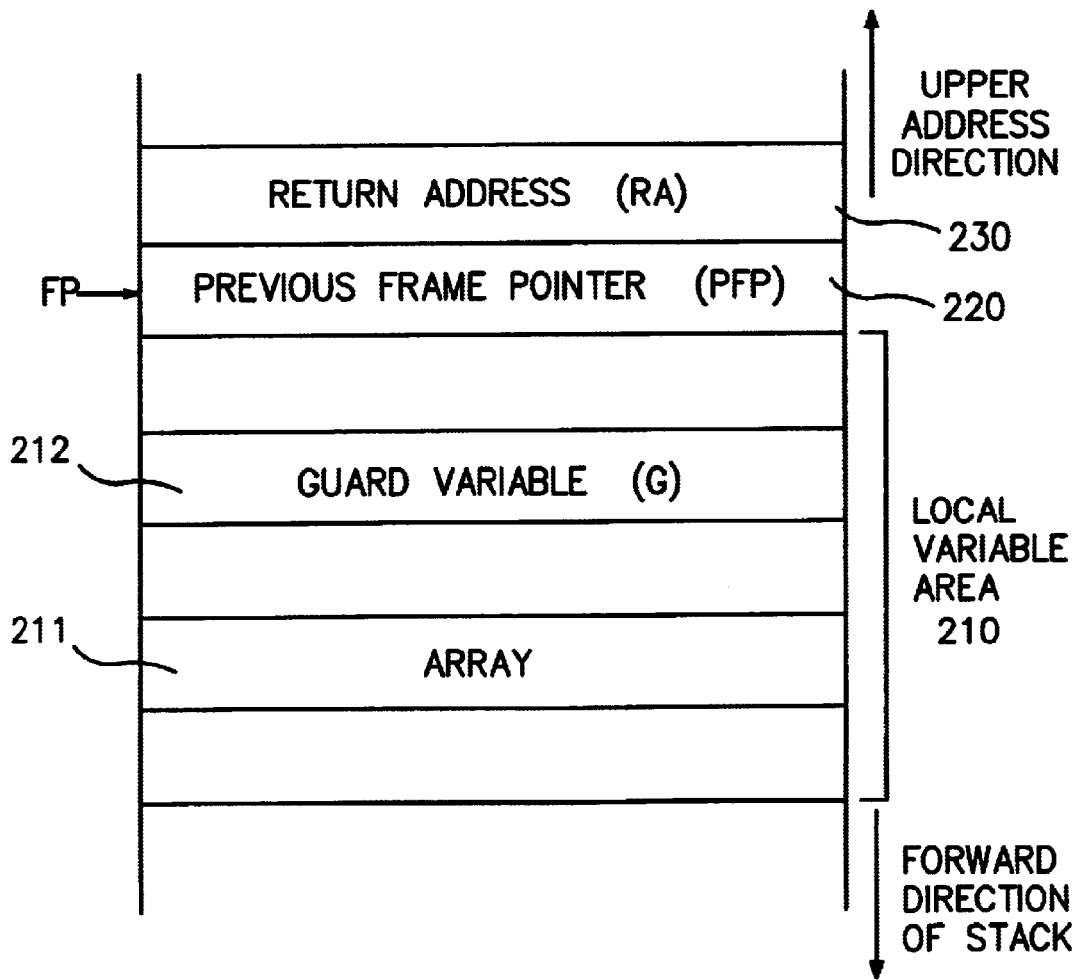
FIG. 2 is a diagram showing the state (the memory pattern) of a stack when the stack protection process is performed in accordance with the embodiment.

FIG. 2 is a diagram showing the state (memory pattern) of the stack in the memory device when the stack protection process is performed according to this embodiment. As is shown in FIG. 2, beginning at the stack top (the bottom in FIG. 2), a local variable area 210, a previous frame pointer (PFP) 220 and a return address (RA) 230 to a calling source are stacked, in the given order. In the local variable area 210, a guard variable (G) 212 is stored before a data array 211, i.e., between the array 211 and the previous frame pointer (PFP) 220. Only the location of the guard variable (G) 212, between the data array 211 and the previous frame pointer (PFP) 220, can not be changed; no limits are placed on the positional relationships of the other local variables stored within this range.

Figure 3:
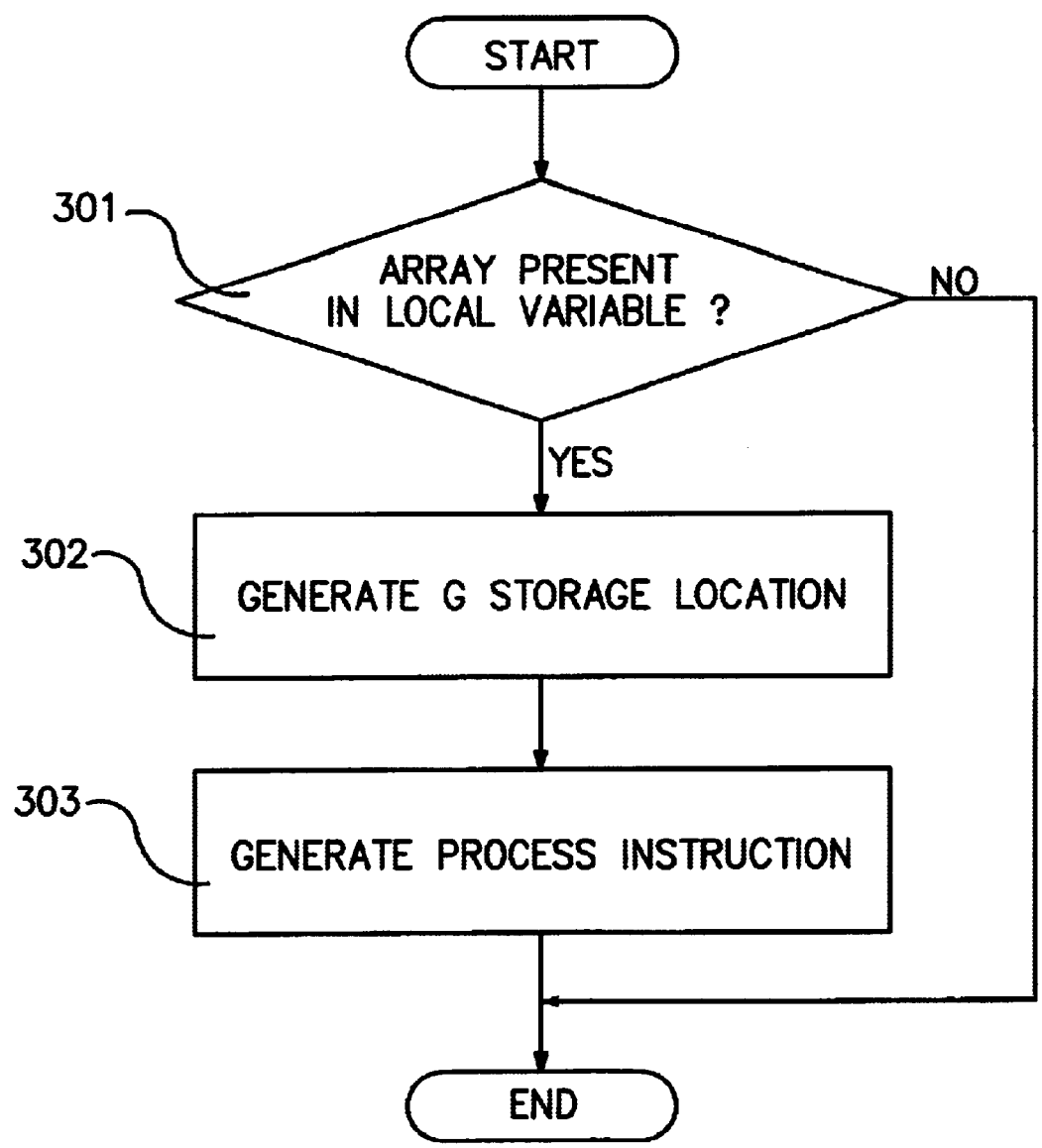
FIG. 3 is a flowchart for explaining the processing performed by the stack protection instruction preparation unit in this embodiment.

FIG. 3 is a flowchart for explaining the processing of the stack protection instruction preparation unit 112 in the stack protection system in FIG. 1. The stack protection preparation unit 112 executes the processing in FIG. 3 for each sub-routine in the source program 111. While referring to FIG. 3, the stack protection instruction preparation unit 112 determines whether the data array is employed as a local variable in an object sub-routine (step 301).

When the data array is so employed, the storage location of the guard variable (G) is determined (step 302). As is described above, the storage location of the guard variable (G) is an arbitrary position between the previous frame pointer and the data array. Then, when the sub-routine is to be executed, an instruction is generated to store the guard variable (G) at the storage location determined at step 302 (step 303).

Through this processing, the program 121, to which the guard variable storage instruction and the guard variable storage location are added, is output.

Actually, for each sub-routine (function) into which a guard variable should be inserted, commands are embedded in the program 121 to declare a guard variable, to designate the value of a guard variable upon the entrance of a function, to confirm the value of the guard variable upon the exit of the function, and to execute an abnormal end process. A specific example structure for this program 121 will be described later.

Figure 4:
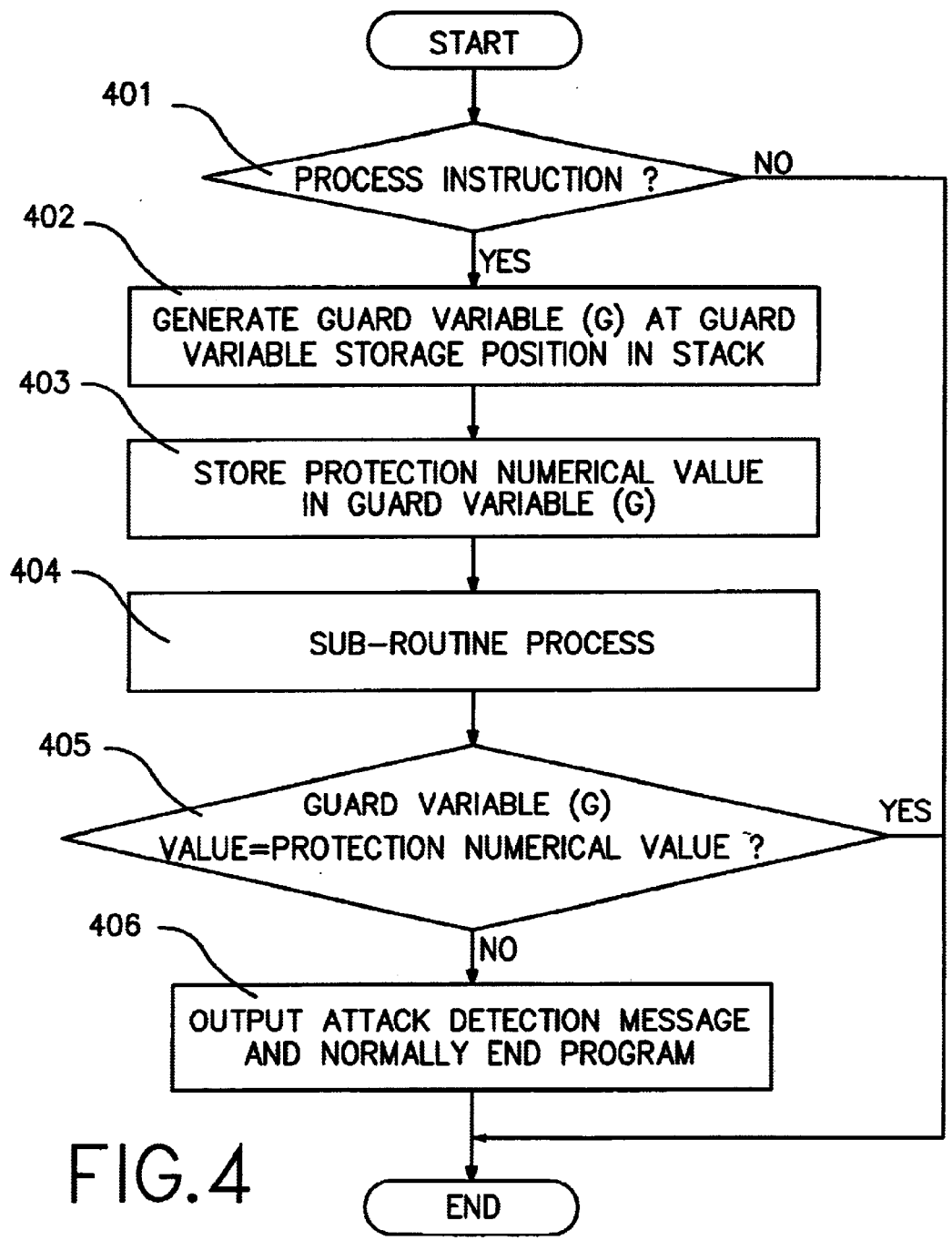
FIG. 4 is a flowchart for explaining the processing performed by the stack protection execution unit in this embodiment.

FIG. 4 is a flowchart for explaining the processing performed by the stack protection execution unit 132. The stack protection execution unit 132 performs the processing in FIG. 4 for each sub-routine of the program to which the guard variable storage instruction and the guard variable storage location are added by the stack protection instruction preparation unit 112. In FIG. 4, first, a check is performed to determine whether an instruction added by the stack protection instruction preparation unit 112 is present in the object sub-routine of the program (step 401).

If such an instruction is present, the storage area for the guard variable (G) is generated at the position in the stack 131 that corresponds to the guard variable (G) storage location, which, together with the storage instruction, is added to the program 121 (step 402). As is described above, the guard variable (G) storage area is a local variable area in the stack 131, and is allocated above the data array.

Then, the protection numerical value 133 is stored in the guard variable (G) storage area generated at step 402 (step 403). The thus obtained stack 131 is shown in FIG. 2. The contents of the protection numerical value 133, which is stored as the guard variable (G), is not particularly limited, but should be a value that an attacker can not guess or that is not on file during an attack. A random number can be employed as an example numerical value.

The process (function) provided by the pertinent sub-routine is performed (step 404), and then a check is made to determine whether the value stored as the guard variable (G) is maintained at the exit of the function (step 405). If the value of the guard variable (G) is maintained, the processing is normally terminated. But if the value of the guard variable (G) is not maintained, it is assumed that a stack smashing attack has occurred, and a message indicating the occurrence of the attack and an error log are output. Then, the program is terminated (step 406).

As is described above, if a stack smashing attack is delivered, it can be detected immediately before the return process, and an intrusion can be prevented.

For the stack protection system of this embodiment, when the program is to be executed, as is shown in FIG. 2 the guard variable need only be located between the previous frame pointer and the data array in the stack as a resultant memory pattern. Therefore, in accordance with the programming language type and the system mode, various forms can be employed to carry out the stack protection system of this embodiment For example, when the programming language is a compiled language, the function of the stack protection instruction preparation unit 112 can be mounted on a compiler. In this case, the program 121, to which the storage instruction and the storage location for the guard variable (G) are added by the stack protection instruction preparation unit 112, is an execution type program. It is preferable that a program for inserting a guard variable be embedded when the compiler code is generated, because it is easy to locate the declaration of a guard variable at an address in the stack that is higher than the variable that causes an overflow, and to insert a program at the exits for all the functions.

When the programming language is an interpreted language, the source program 121 is unchanged when the storage instruction and the storage location of the guard variable (G) are added by the stack protection instruction preparation unit 112.

Further, when the programming language is a compiled language, a processor that constitutes the stack protection instruction preparation unit 112 may be placed before the compiler, and the guard variable insertion program may be embedded in the program in the source form. An explanation will be given, while referring to FIGS. 5 and 6, for a C language example wherein a guard variable insertion program is embedded in a source program.

Figures 10, 11:
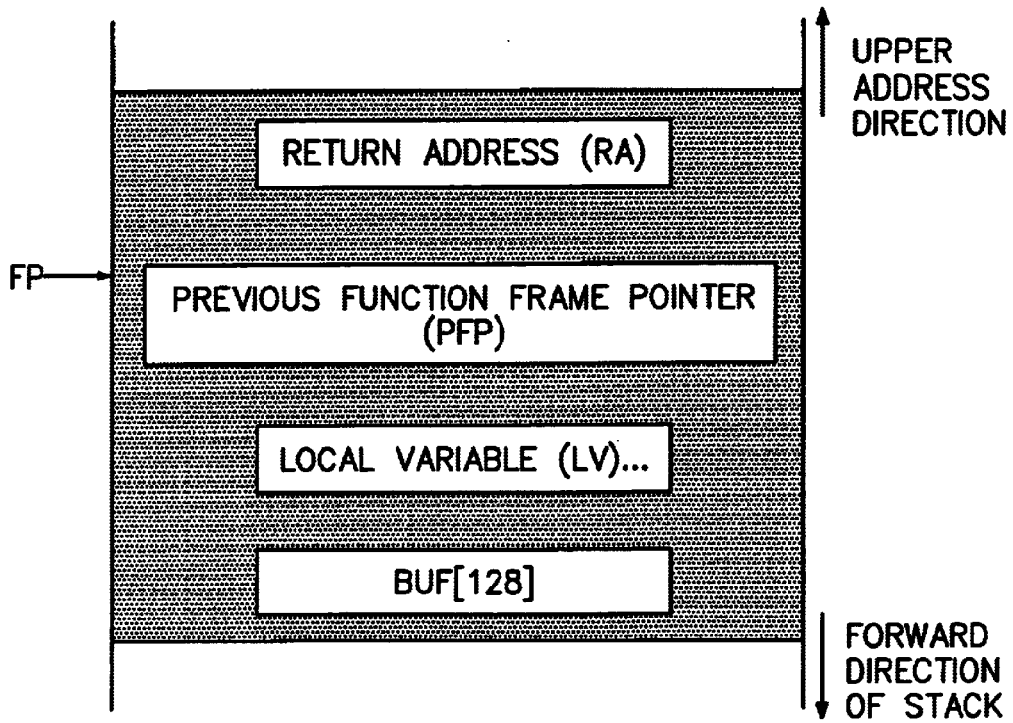
FIG. 10 is a diagram showing an example program written in the C.
FIG. 11 is a diagram for explaining the state of the stack when a stack smashing attack is launched against the program in FIG. 10.

In this case, the stack protection instruction preparation unit 112 inserts the three programs in FIG. 5 into the program variable declaration portion and the entrance and the exit of the function in FIG. 10. The state wherein the programs are inserted is shown in FIG. 6. In FIG. 6, the three programs shown in FIG. 5 are inserted into a position 601, which is the variable declaration portion, a position 602, which is the entrance of the function, and a position 603, which is the exit of the function.

As is described above, in accordance with the programming language type and the system form, various modes can be employed to carry out the stack protection system. In addition to the above processing, in the process for generating a source program the programs shown in FIG. 5 can be written manually for a desired function. This case corresponds to the manual performance of the process of the stack protection instruction preparation unit 112. Thus, from the beginning, the obtained program has the same state as the program 121, and only the processing for the stack protection execution unit 132 is performed by the stack protection system.

Figure 7:
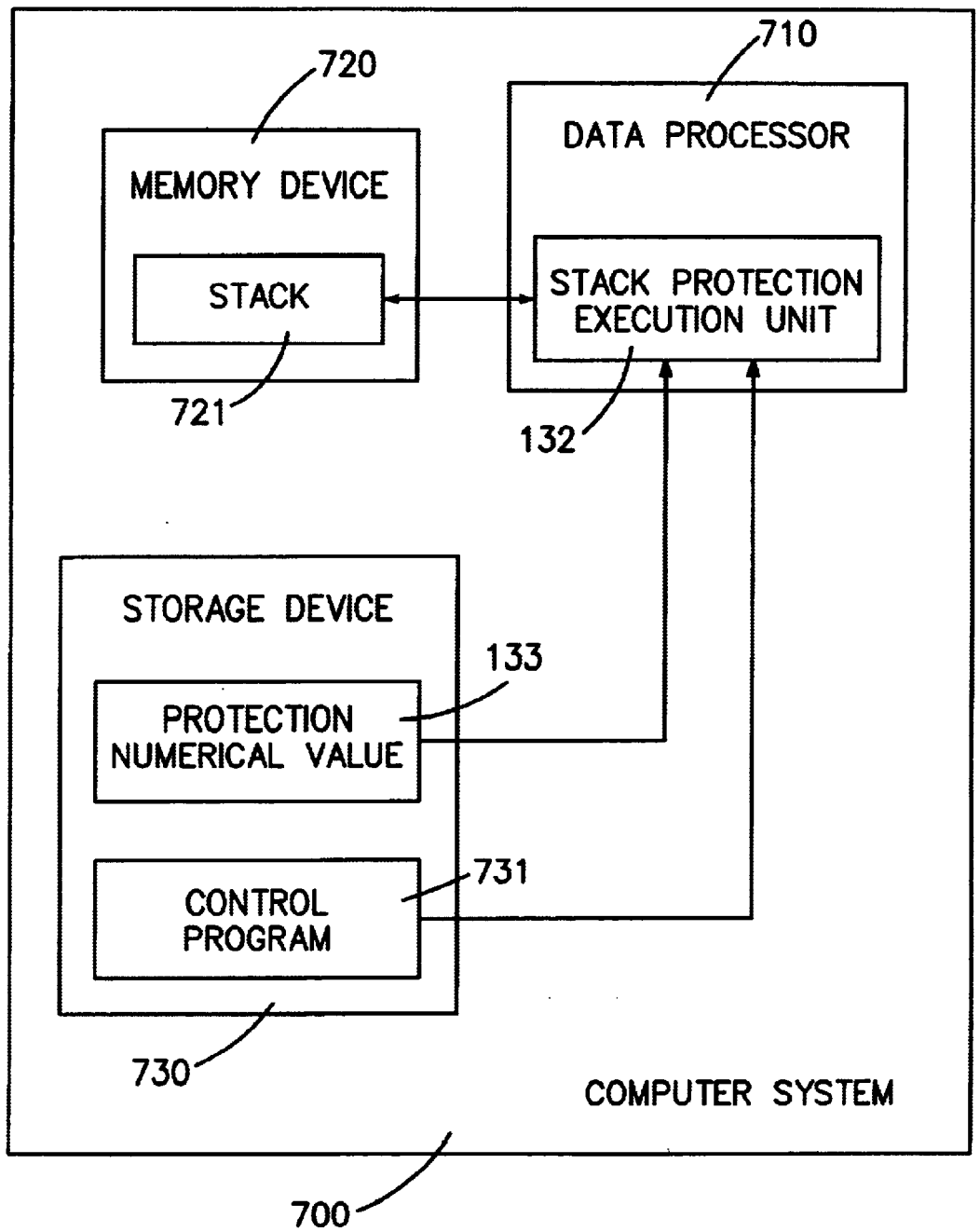
FIG. 7 is a diagram for explaining an example arrangement for a computer system that employs the stack protection system according to the embodiment.

FIG. 7 is a diagram for explaining the structure of a computer system for which the stack protection system of this embodiment is applied. A computer system 700 in FIG. 7 comprises: a data processor 710, for processing data; a memory device 720, used by the data processor 710; and a storage device 730, for storing a control program 731 that controls the data processor 710.

The data processor 710, which is a CPU carries out the function of the stack protection execution unit 132 as directed by the control program 731. Since the stack protection execution unit 132 executes the function, the memory pattern in FIG. 2, including the guard variable, is formed in a stack 721 in the memory device 720. Further, when the memory pattern is to be formed in the stack 721 of the memory device 720, the stack protection execution unit 132 in the data processor 710 reads the numerical protection value 133 from the storage device 730, and inserts it as a guard variable.

When a compiler language is employed for the computer system 700, the control program 731 has an execution form that corresponds to the program 121 in FIG. 1, and the control program 731 stored in the storage device 730 can be a source program to which the storage instruction and the storage location for the guard variable are added. In this case, the data processor 710 also includes the compiler function. Further, the control program 731 can also be a source program, before the storage instruction and the storage location for the guard variable are added. In this case, the control program 731 corresponds to the source program 111 in FIG. 1, and the data processor 710 includes in addition the function of the stack protection instruction preparation unit 112. In FIG. 7, the memory device 720 and the storage device 730 are separately provided; however, physically these two components can be constituted by a single storage module.

A reduction in the overflows that occurs in this embodiment will now be described. In a program for which the variable type declaration exactly corresponds to its reference, a variable for which a buffer overflow occurs is an array for which no size information is included. Since this type of array, which is used in the C language, does not include size information, a buffer overflow can not be prevented merely by examining the compiler type. For variables other than this, buffer overflows can be prevented merely by paying attention to type conversions performed as part of a programming process.

Therefore, in the above embodiment, as is shown in FIG. 2, the guard variable is stored between the previous frame pointer and the array in the local variable area of the stack, but when an array is not included as a local variable, the guard variable is not stored. As a result, the overhead required by the system can be reduced.

In a program for which the variable type declaration exactly corresponds to its reference, a buffer overflow test using a guard variable need not be conducted for a function (hereafter referred to as an AF function) wherein an array is not included in a test area. An explanation will be given as proof of this.

Figure 8:
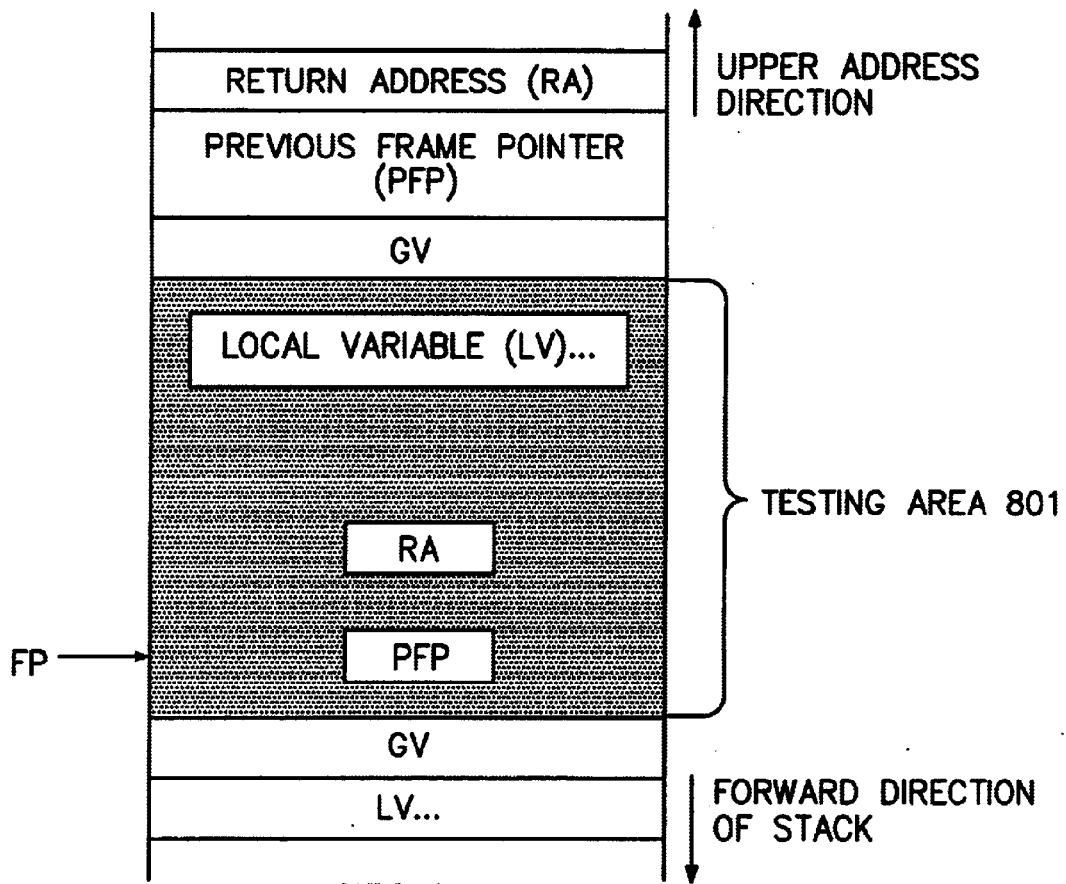
FIG. 8 is a diagram for explaining a testing area in a stack.
Figure 9:
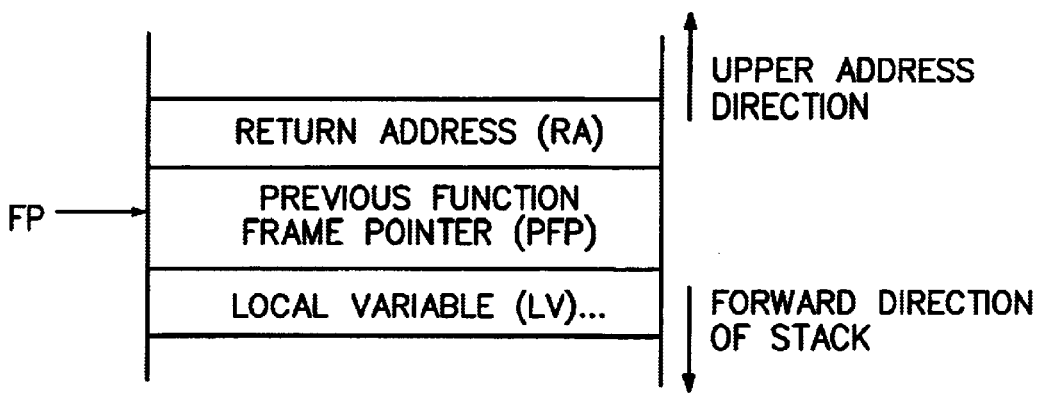
FIG. 9 is a diagram for explaining the state of the stack after a C language function is called.

FIG. 8 is a diagram for explaining a test area in a stack. The area for testing for an overflow using the guard variable in the stack is the area between the guard variable and a lower guard variable, i.e., the shaded area in FIG. 8. This area is called a function testing area 801. The proof is provided by the following two steps.

1. The testing area 801 of the AF function is destroyed only when an overflow occurs in the testing area 801 for a function that is thereafter called.

2. The destruction of the testing area 801 of the AF function means that execution control will not return to the AF function.

The first step will now be described. An array is not present in the testing area 801 of the AF function, and therefore, even if the testing area 801 is destroyed it will not be the cause or the source of a buffer overflow. For this reason, the cause of the destruction of the testing area 801 would be that the testing area 801 is located in the pertinent function frame in the stack. That is, a buffer overflow occurs in the function that is called from the AF function, and the destruction occurs toward the upper address in the stack, destroying the testing area of the AF function.

The second step will now be described. As was remarked when describing the first step, the cause of the destruction of the testing area 801 of the AF function is another function that is called thereafter. Further, in a program wherein the variable type declaration exactly corresponds to the reference, since the variable by which a buffer overflow is caused is an array, an array is disposed in the area that is the cause of the destruction of the testing area 801 of the AF function, and the testing for a buffer overflow, which is performed using the guard variable, is conducted for the function that defines the array. When an attack is delivered to destroy the testing area 801 and to operate a return address, the guard variable is always destroyed. Thus, the program is halted during the function return process, and execution control is not returned to the AF function.

It is therefore proved that the testing for a buffer overflow, for which the guard variable is used, need not be conducted for an AF function that does not have an array in the testing area 801.

In the embodiment, stack protection using the guard variable has been provided for a general array; however, stack protection using a guard variable may be performed only for a character string. This is mainly because character strings are targeted by stack smashing attacks. For this reason, a character string is characterized in that it is employed to represent information outside the program, and includes an end symbol that is to be processed without the data size being confirmed.

Therefore, the function for employing the guard variable for the stack protection can be limited to the one that has a character string as a local variable, and the guard variable is not stored for a function that has having no character string, or for a function having an array, such as an integer string, other than a character string. Thus, the overhead for the system can be reduced.

As is described above, according to the embodiment, the validity of the guard variable, which is stored between the previous frame pointer and the data array in the stack, is confirmed during the function return process. Therefore, a stack smashing attack caused by the overflow of a buffer in the stack can be prevented, regardless of whether it is delivered via the network or whether its source is a local user.

In this embodiment, stack protection using the guard variable is provided only for a function that includes an array as a local variable. Thus, compared with the conventional art wherein stack protection is provided for all functions, the overhead can be reduced. Especially, when compared with a case wherein writing to the return address storage location is inhibited, or a case wherein the dedicated stack for the return address is prepared, a considerable reduction in the overhead can be realized.

Further, when stack protection using the guard variable is provided only for a function that includes a character string as a local variable, the overhead can be even further reduced.

In this embodiment, unlike the conventional art, the frame structure of the stack is not changed in order to store the guard variable in the local variable area. Therefore, no inconvenience, such as that the debugging support process, for which a debugger is used, can not be performed for a program, is experienced.

As is described above, according to the present invention, all stack smashing attacks that are caused by stack buffer overflows can be prevented. Further, the execution overhead incurred due to the mounting of the stack smashing attack prevention means can be reduced.

Having thus described our invention, what is claimed is:

1. A memory pattern for a memory device for use by a computer system, wherein the memory pattern is obtained after a function is called when said computer system executes a program, said memory pattern comprising:
   a return address storage area for storing a return address for the source of a call for the execution of a currently active function;
   a previous frame pointer storage area for storing a previous frame pointer to said calling source for the execution of a currently active function; and
   a local variable storage area to be located below said return address storage area and said previous frame pointer storage area,
   wherein when a data array is stored in said local variable area, a guard variable is stored in a location preceding said data array between said frame pointer and said data array, and
   wherein said guard variable is used as a target to confirm whether said return address has been destroyed.

2. The memory device according to claim 1, wherein, when a character string is stored in said local variable storage area in said memory pattern of said memory device, said guard variable is stored preceding said character string.

3. The memory device according to claim 1, wherein a random number can be employed as said guard variable that is stored in said local variable storage area in said memory pattern of said memory device.

4. A memory device for use by a computer system, said memory device having a memory pattern obtained after a function is called while said computer system is executing a program, said memory pattern comprising:
   a return address storage area for storing a return address for the source of a call for a function that is currently being executed;
   a previous frame pointer storage area located below said return address storage area for the storage of a previous frame pointer for the source of said call; and
   a local variable storage area located below said previous frame pointer storage area,
   wherein when a data array is stored in said local variable storage area, a guard variable is stored between said previous frame pointer and said data array, and
   wherein said guard variable is used as a target to confirm whether said return address has been destroyed during a process for returning from said function that is currently being executed.

5. A stack protection system, which protects a program counter from a stack smashing attack while a computer is executing a program, comprising:
   a stack protection instruction preparation unit for receiving a source program, and for adding, to said source program, an instruction for storing a guard variable between a previous frame pointer in a stack that is obtained after a function has been called, and a data array stored in said stack as a local variable; and
   a stack protection execution unit for executing said program to which said instruction for storing said guard variable is added by said stack protection instruction preparation unit, and for, in accordance with said instruction, storing said guard variable in said stack during a function calling process and for confirming the validity of said guard variable during a function return process.

6. The stack protection system according to claim 5, wherein, when destruction of said guard variable is discovered during said function return process, said stack protection execution unit performs an abnormal end process to halt the execution of said program, and to notify a user of an occurrence of a stack smashing attack.

7. The stack protection system according to claim 5, wherein said stack protection instruction preparation unit is mounted in a compiler that processes said source program written in a compatible language, when said source program is translated into an object program, the compiler adds to said object program an instruction for the storage of said guard variable.

8. A stack protection system, which protects a program counter from a stack smashing attack when a computer executes a program, comprising:

program execution means, for receiving and executing a program to which an instruction is added for the storage, before a function is executed, of a guard variable between a previous frame pointer in a stack and a data array stored as a local variable in said stack, and for, in accordance with said instruction, storing said guard variable in said stack during a function calling process, and for confirming the validity of said guard variable during a function return process; and abnormal end execution means for, when said program execution means detects during said function return process that said guard variable has been destroyed, performing an abnormal end process for halting the execution of a program and for notifying a user that a stack smashing attack has occurred.

9. A computer system comprising:

a data processor for performing various calculations; and a memory device that is used by said data processor for said calculations and that has a memory pattern that is obtained after a function is called while said computer system is executing a program, said memory pattern including:

a return address storage area for storing a return address for the source of a call for a function that is currently being executed, a previous frame pointer storage area for storing a previous frame pointer for said source of said call for the function that is currently being executed, and a local variable storage area that is located below said return address storage area and said previous frame pointer storage area, wherein, when a data array is stored in said local variable storage area, a guard variable is stored preceding said data array in said local variable area, between said frame pointer and the data array, and wherein, said guard variable is used as a target to confirm, during a process for the return of said function that is currently being executed, whether said return address has been destroyed.

10. A computer system comprising:

a data processor for performing various calculations; and a memory device used by said data processor for said calculations, that has a memory pattern that is obtained after a function is called while said computer system is executing a program, said memory pattern including a return address storage area for storing a return address for a source that called a function that is currently being executed, a previous frame pointer storage area that is located below said return address storage area for the storage of a previous frame pointer for said source that called said function, and a local variable storage area that is located below said previous frame pointer storage area, wherein when a data array is stored in said local variable storage area, a guard variable is stored between said previous frame pointer and said data array, and wherein said guard variable is used as a target to confirm whether said return address has been destroyed during a process for returning from said function that is currently being executed.

11. A computer system, which controls a program for performing various calculations, comprising:

a data processor for reading and executing a program to which an instruction is added for the storage, when a function is to be executed, of a guard variable between a previous frame pointer in a stack and a data array stored as a local variable in said stack; and a memory device used by said data processor to perform calculations, wherein, in accordance with said instruction for storing said guard variable that is added to said program, said data processor stores said guard variable in said stack of said memory device during a function calling process, and confirms the validity of said guard variable during a function return process.

12. The computer system according to claim 11, wherein, when destruction of said guard variable is found during said function return process, said data processor performs an abnormal end process to halt the execution of said program, and to notify a user of the occurrence of a stack smashing attack.

13. A computer system, which controls a program for performing various calculations, comprising:

a data processor for receiving a source program and for adding, to said source program, an instruction for storing a guard variable between a previous frame pointer in a stack that is obtained after a function is called, and a data array stored in said stack as a local variable, and for executing said program to which said instruction for storing said guard variable has been added; and a memory device used by said data processor to perform said calculations, wherein in accordance with said instruction for storing said guard variable said data processor stores said guard variable in said stack of said memory device during a function calling process, and confirms the validity of said guard variable during a function return process.

14. The computer system according to claim 13, wherein, when destruction of said guard variable is discovered during said function return process, said data processor performs an abnormal end process to halt the execution of said program, and to notify a user of the occurrence of a stack smashing attack.

15. A compiler, which receives a source program, translates said source program to provide an object program and then outputs said object program, comprising:

translation means for translating a program; and stack protection instruction addition means for examining each sub-routine to determine whether a function included in said sub-routine has a data array, and for, when a data array is included, adding to said sub-routine an instruction for storing, before a function is executed, a guard variable between a previous frame pointer in a stack and a data array stored as a local variable in said stack, and for confirming the validity of said guard variable during a function return process.

16. A stack protection method, whereby a program counter is protected from a stack smashing attack while a computer is executing a program, comprising the steps of:

adding, to a source program, an instruction for storing a guard variable between a previous frame pointer in a stack that is obtained after a function has been called, and a data array stored in said stack as a local variable;

executing said program to which said instruction for storing said guard variable is added, and, in accordance with said instruction, storing said guard variable in said stack during a function calling process and confirming the validity of said guard variable during a function return process;

when destruction of said guard variable is discovered during said function return process, halting the execution of said program and notifying a user of an occurrence of a stack smashing attack.

17. A stack protection method, whereby a program counter is protected from a stack smashing attack when a computer executes a program, comprising the steps of:

executing a program to which an instruction is added for the storage, before a function is executed, of a guard variable between a previous frame pointer in a stack and a data array stored as a local variable in said stack, and, in accordance with said instruction, storing said guard variable in said stack during a function calling process and confirming the validity of said guard variable during a function return process; and when it is detected during said function return process that said guard variable has been destroyed, halting the execution of a program and notifying a user that a stack smashing attack has occurred.

18. A storage medium on which input means for a computer stores a computer-readable program, said program permitting said computer to perform:

a process for storing, before a function having a data array is executed, a guard variable between a previous frame pointer in a stack and a data array stored as a local variable in said stack;

a process for confirming the validity of said guard variable during a function return process; and a process for, when it is detected during said function return process that said guard variable has been destroyed, halting the execution of a program and notifying a user that a stack smashing attack has occurred.

19. A program transmission apparatus comprising:

storage means for storing a program that permits a computer to perform a process for storing, before a function having a data array is executed, a guard variable between a previous frame pointer in a stack and a data array stored as a local variable in said stack, a process for confirming the validity of said guard variable during a function return process, and a process for, when it is detected during said function return process that said guard variable has been destroyed, halting the execution of a program and notifying a user that a stack smashing attack has occurred; and transmission means for reading said program from said storage means and for transmitting said program.

* * * * *